United States Patent [19]
Kato et al.

[11] 4,104,560
[45] Aug. 1, 1978

[54] LIGHTING SYSTEM FOR A MOTOR VEHICLE

[75] Inventors: Tetsuo Kato, Anjo; Kazumasa Mori, Aichi, both of Japan

[73] Assignee: Nippondenso Co., Ltd., Kariya, Japan

[21] Appl. No.: 771,471

[22] Filed: Feb. 24, 1977

Related U.S. Application Data

[63] Continuation of Ser. No. 603,502, Aug. 11, 1975, abandoned.

[30] Foreign Application Priority Data

Aug. 21, 1974 [JP] Japan ................................ 49/96312

[51] Int. Cl.² .............................................. B60Q 1/02
[52] U.S. Cl. ......................................... 315/83; 315/91; 315/93; 315/131; 315/82
[58] Field of Search ...................... 315/83, 84, 91, 86, 315/93, 131, 132, 90, 194, 199, 82

[56] References Cited

U.S. PATENT DOCUMENTS

| | | | |
|---|---|---|---|
| 3,479,557 | 11/1969 | Schultz | 315/83 |
| 3,535,585 | 10/1970 | Barnum | 315/83 |
| 3,631,441 | 12/1971 | Murphy | 315/83 |
| 3,673,456 | 6/1972 | Sonius | 315/83 |
| 3,733,515 | 5/1973 | Parkes | 315/83 |
| 3,814,984 | 6/1974 | Morita et al. | 315/83 |

*Primary Examiner*—Saxfield Chatmon, Jr.
*Attorney, Agent, or Firm*—Cushman, Darby & Cushman

[57] ABSTRACT

A voltage detecting means, such as a voltage winding, a zener diode or the like, is connected across a power source and is operative when the voltage applied thereto exceeds a predetermined value owing to a disconnection of a main lamp also connected across said power source. A disconnection indicating means, such as a lamp, is connected to the voltage detecting means and is energized when the volage detecting means operates.

3 Claims, 7 Drawing Figures

LIGHTING SYSTEM FOR A MOTOR VEHICLE

This is a continuation, of application Ser. No. 603,502 filed Aug. 11, 1975, now abandoned.

BACKGROUND OF THE INVENTION

1. Field of the Invention

The present invention relates to a lighting system for a motor vehicle, and especially to an improvement of a lighting system for a motorcycle with a magneto generator.

2. Brief Description of Prior Art

As a conventional lighting system for a motor vehicle is not provided with any additional means for lighting the area in front of the motor vehicle other than a main headlight, characteristic is very dangerous to drive at night when alternating main headlight is inoperative.

In a known type of lighting system, in which there is provided a relay for detecting a disconnection of a main headlight and an additional lamp means energized by the relay for lighting when the main headlight is inoperative, the relay must be continuously supplied with current for detecting the disconnection, resulting in a large consumption of electric power.

SUMMARY OF THE INVENTION

It is, therefore, a primary object of the present invention to provide an improved lighting system which can detect a disconnection of a main headlight and energize an additional lamp for lighting the area in front of a motor vehicle.

It is aother object of the present invention to provide a lighting system which can detect a disconnection of a main headlight without any constant consumption of electric power when the main headlight is operative.

These objects are accomplished by connecting across the power source a detecting means which responds to an increase in voltage resulting from the disruption in operation of the main headlight to cause the energization of an additional lamp.

Other objects and advantages will be more apparent when read in connection with the following description, the appended claims and drawings.

DESCRIPTION OF THE PREFERRED EMBODIMENTS

Figure 1:
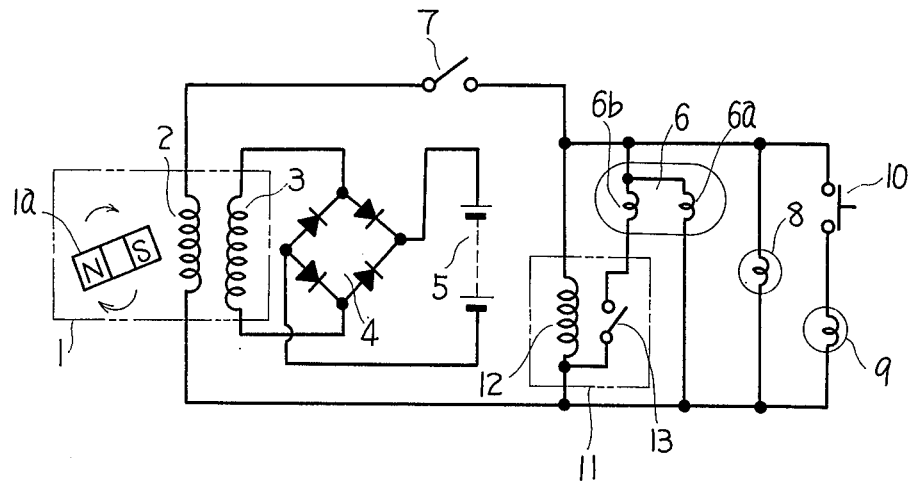
FIG. 1 is a schematic diagram showing a first embodiment of a lighting system according to the present invention.

Referring to FIG. 1, a rotor 1a with permanent magnets is rotated, for example, by an internal combustion engine to which a magneto generator 1 is fixed. Voltage generating windings 2 and 3 mounted in a stator of the magneto generator 1 generates alternating current in accordance with the rotation of the rotor 1a. One of the windings 3 is mainly used for charging a battery 5 mounted in a motor vehicle, wherein a full-wave rectifier 4 is employed for rectifying the alternating current of the winding 3 to convert it into direct current. An electrical load (not shown), such as an ignition system or the like, is connected to the battery 5. The other winding 2 is used for supplying electric power to a lighting system including a headlight 6, a lamp 8 for a front meter panel, and a stop lamp 9 through a key switch 7. the stop lamp 9 is energized by selective actuation of a stop switch 10.

The headlight 6 includes a main lamp 6a and an additional, or auxiliary, lamp 6b, which are provided in a common lamp body. A disconnection detecting means 11 comprises a voltage winding 12 connected across the voltage generating winding 2 (and across the main lamp 6) and a contact 13 energized to close when the electromotive force at the voltage winding 12 exceeds a predetermined amount. The additional lamp 6b of the headlight 6 is connected in series with the contact 13 across the voltage generating winding 2. The operation of the first embodiment shown in FIG. 1 will now be described with reference to FIG. 2.

When the key switch 7 is closed and the magneto generator 1 is rotated by the engine, the main lamp 6a and the lamp 8 are lighted, and additionally the stop light 9 is lighted on a closure of the stop switch 10. When the lighting system including the headlight 6, the lamp 8 and so on operates normally, the voltage across the voltage winding 12 does not exceed the level necessary to close the contact 13, whereby the additional lamp 6b is de-energized during the normal operation of the lighting system. However, when the main lamp 6a burns out, the output voltage of the winding 2, i.e., the voltage across the voltage winding 12, is greatly increased since the load for the winding 2 is decreased because of the inoperative main lamp 6a. As a result, the voltage across the voltage winding 12 becomes sufficient to close the contact 13, thereby to light the additional lamp 6b in substitution for the main lamp 6a.

Figure 2:
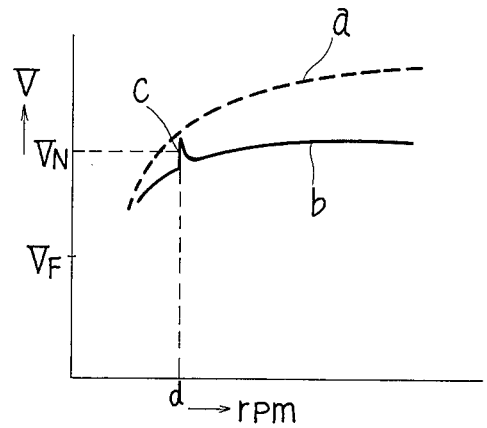
FIG. 2 is a diagram showing output voltage waveforms of a generator shown in FIG. 1.

In FIG. 2, a dotted line $a$ shows the characteristic curve of the output voltage at the winding 2 in relation to the rotaional speed of the magneto generator 1 when the main lamp 6a is inoperative. The solid line $b$ shows the characteristic curve of the output voltage at the winding 2 in relation to rotational speed with the main lamp 6a operative up to the rotational speed $d$ of the magneto generator and with the additional lamp 6b operative above the rotational speed $d$. That is, the main lamp 6a becomes inoperative and a rapid increase of the output voltage designated by $c$ occurs at the speed $d$. Accodingly, the voltage winding 12 is supplied with a sufficient voltage with the rapid increase to close contact 13, since the necessary voltage $V_N$ required for closing the contact 13 is exceeded. Thereafter, the contact 13 is kept closed as long as the voltage across the voltage winding 12 is kept above a voltage $V_F$ below which the contact 13 opens due to a lack of electromotive force produced by the voltage winding 12.

As noted from the above description, the disconnection detecting means 11 has an operating characteristic wherein the contact 13 is closed above the output voltage $V_N$ and opened below the output voltage $V_F$.

As a variation of the foregoing embodiment, the voltage winding 12 may be replaced by a series circuit of a resistor and a current winding for detecting a rapid increase of an output accurent at a disconnection or interruption in operation of lamp 6a in the same manner as described above.

Still further, the disconnection detecting means 11 may be replaced by a self-holding type circuit including a voltage winding and a contact having no hysteresis characteristic.

Figure 3:
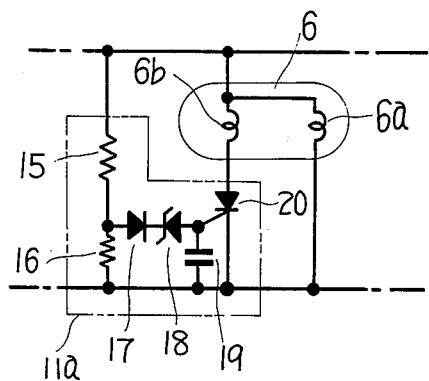
FIG. 3 is a schematic diagram showing a second embodiment of the present invention.

FIG. 3 illustrates the principal elements of a second embodiment of the present invention wherein disconnection detecting means 11a comprises a series connection of resistors 15 and 16 connected across the winding 2 (not shown), a diode 17, a zener diode 18, a noise suppressing capacitor 19 and a thyristor 20. The thyristor 20 is connected in series with the additional lamp 6b and the gate thereof is connected to the zener diode 18.

When the main lamp 6a becomes inoperative and the output voltage at the winding 2 rises, the zener diode 18 breaks down to drive the thyristor 20 into conduction, whereby the additional lamp 6b is energized. In this embodiment, only alternate half waves of the alternating current produced by the winding 2 are used in the additional lamp 6b. However, the thyristor 20 may be replaced by a bidirectional thyristor, whereby both the positive and negative-going waves of the alternating current may be used in energizing the additional lamp 6b.

Figure 4:
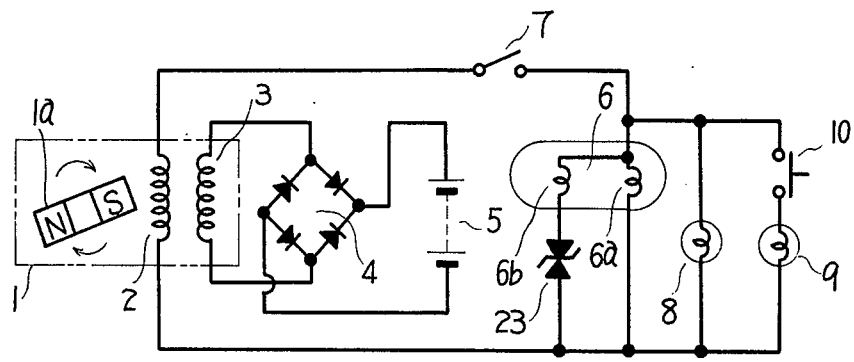
FIG. 4 is a schematic diagram showing a third embodiment of the present invention.
Figure 5:
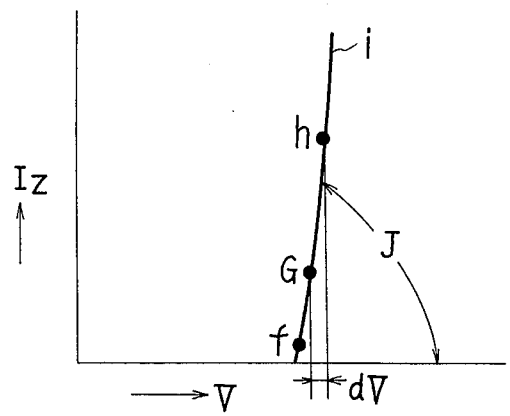
FIG. 5 is a diagram showing the voltage-current relationship of a regulator shown in FIG. 4.

In FIG. 4 a third embodiment of the present invention is shown, a zener diode 23 being employed as a disconnection detecting means which also serves as a voltage regulator for the output voltage of the winding 2. The operation of the third embodiment will be explained with reference to FIG. 5.

When the main lamp 6a and the zener diode 23 are operating normally, current $I_Z$ flows through the zener diode 23. However, the amount of the current $I_Z$ is limited within a rather low range between F and G, which is not enough to energize the additional lamp 6b to cause substantial illumination. When the main lamp 6a becomes inoperative, the output voltage at the winding 2 tends to increase rapidly and the current $I_Z$ through the zener is increased to a higher value indicated by H. This increased zener current is large enough to energize the additional lamp 6b to emit considerable light, yet the voltage increase is limited to a small value dV shown in FIG. 5. The letter J designates the inclination of the current increase curve designated by the letter i. As the resistance of the additional lamp 6b becomes smaller, the inclination J becomes larger, whereby the voltage increase dV becomes smaller. Thus, it is apparent that the zener diode 23 performs a voltage regulation function.

Figure 6:
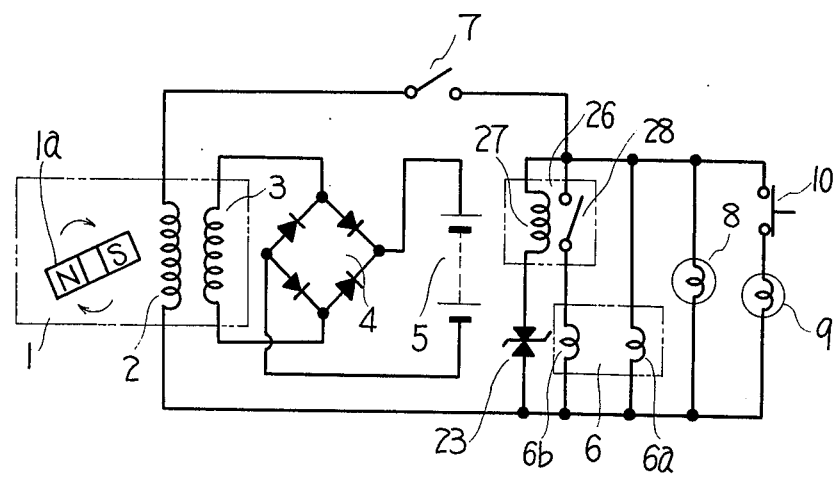
FIG. 6 is a schematic diagram showing a fourth embodiment of the present invention.

FIG. 6 shows a fourth embodiment of the present invention which consists of the addition of a zener diode 23 to the embodiment of FIG. 1. Therefore, in this embodiment not only is the additional lamp 6b energized to light sufficiently during the inoperative condition of the main lamp 6a, but the output voltage of the winding 2 also is regulated as in the same manner described with respect to the preceeding embodiment.

Figure 7:
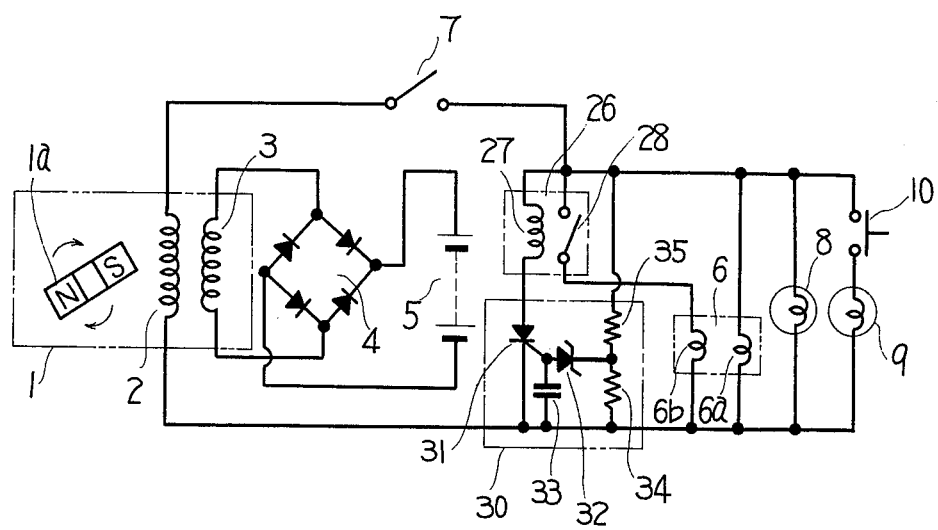
FIG. 7 is a schematic diagram showing a fifth embodiment of the present invention.

FIG. 7 illustrates a fifth embodiment of the present invention which combines the disconnection detecting means 11a shown in FIG. 3 with the embodiment of FIG. 1. Therefore, not only is the additional lamp 6b energized to light sufficiently when the main lamp 6a is inoperative, but also the output voltage of the winding 2 is regulated.

In the above embodiments, the additional lamp 6b may be replaced by other means such as a buzzer of the like in order to inform a driver that lamp 6a is in an inoperative condition.

The lighting system according to the present invention may be applied not only to headlights, but also to other lighting devices.

Two separate voltage generating windings, one for the battery and the other for the lighting system, are explained in the embodiments. However, a single winding can be used for both the battery and the lighting system.

What is claimed is:

1. A lighting system for a motor vehicle of the type having a magneto-generator rotated by an engine of said vehicle to develop alternating voltages from separate first and second windings, said first winding being associated with circuit means for charging a battery, the system comprising:

lighting means including a main lamp and an auxiliary lamp;

a first switching means for connecting the lighting means across the second winding whereby the main lamp is normally conducting;

a second switching means including: (1) a contact switch which is arranged in series with the auxiliary lamp, the series arrangement being connected across the main lamp; and (2) a bidirectional voltage sensing means connected across said main lamp, said sensing means being responsive to a rise in alternating voltage above a predetermined value, in both positive and negative directions, resulting from interruption of the conduction of said main lamp, thereby actuate said contact switch and energize the auxiliary lamp.

2. A lighting system as set forth in claim 1, wherein said voltage sensing means comprises a winding of a relay for actuating the contact switch, said relay having an operating charcteristic whereby the contact switch remains actuated until the altenating voltage drops to a level below said predetermined value.

3. A lighting system as set forth in claim 1, wherein said voltage sensing means comprises a winding of a relay for actuating the contact switch and a bidirectional zener diode.

* * * * *